United States Patent
Matsugatani et al.

[11] Patent Number: 6,097,331
[45] Date of Patent: Aug. 1, 2000

[54] FM-CW RADAR SYSTEM FOR MEASURING DISTANCE TO AND RELATIVE SPEED OF TARGET

[75] Inventors: Kazuoki Matsugatani; Masanobu Yukumatsu, both of Kariya, Japan

[73] Assignee: Denso Corporation, Kariya, Japan

[21] Appl. No.: 09/283,162

[22] Filed: Apr. 1, 1999

[30] Foreign Application Priority Data

Apr. 3, 1998 [JP] Japan ................... 10-092014

[51] Int. Cl.$^7$ ................................. G01S 13/00
[52] U.S. Cl. ................. 342/70; 342/84; 342/85; 342/87; 342/109; 342/130
[58] Field of Search .................. 342/70, 71, 72, 342/84, 85, 87, 99, 100, 101, 109, 111, 112, 115, 116, 128, 129, 130, 131, 132, 134, 135, 192, 193

[56] References Cited

U.S. PATENT DOCUMENTS

| | | | |
|---|---|---|---|
| 3,611,372 | 10/1971 | Fishbein | 342/109 |
| 3,872,475 | 3/1975 | Yamanaka et al. | 342/111 |
| 4,003,049 | 1/1977 | Sterzer et al. | 342/43 |
| 5,274,380 | 12/1993 | Yatsuka et al. | 342/70 |
| 5,381,153 | 1/1995 | Saito et al. | 342/70 |
| 5,677,695 | 10/1997 | Suzuki et al. | 342/109 |
| 5,826,216 | 10/1998 | Lyons et al. | 702/143 |

FOREIGN PATENT DOCUMENTS

| | | |
|---|---|---|
| 2-143186 | 6/1990 | Japan . |
| 5-40169 | 2/1993 | Japan . |
| 8-146125 | 6/1996 | Japan . |
| 9-145826 | 6/1997 | Japan . |

OTHER PUBLICATIONS

"Radar System" pp., 52–54 ( w/partial English translation, etc.).

*Primary Examiner*—John B. Sotomayor
*Attorney, Agent, or Firm*—Pillsbury Madison & Sutro LLP

[57] ABSTRACT

An FM-CW radar apparatus is provided which may be employed in automotive anti-collision or radar cruise control systems. The radar apparatus transmits as a radar wave a high-frequency signal which is so modulated in frequency with a modulating signal as to vary with time in the form of a triangular wave and mixes a received signal with a local signal that is part of the transmitted signal to produce a beat signal consisting of a fundamental frequency component as a function of the distance to and relative speed of a target object. The radar apparatus also includes an amplitude modulator which modulates the amplitude of at least one of the transmitted signal, the received signal, and the local signal in accordance with the modulating signal so that the modulation index falls within a range of zero (0) to one (1). This allows harmonic components with an improved SN ratio to be extracted from the beat signal which may be used in calculating the fundamental frequency component of the beat signal.

12 Claims, 9 Drawing Sheets

FM-CW RADAR SYSTEM FOR MEASURING DISTANCE TO AND RELATIVE SPEED OF TARGET

BACKGROUND OF THE INVENTION

1 Technical Field of the Invention

The present invention relates generally to an FM-CW radar apparatus which may be employed in anti-collision systems installed in moving objects such as automotive vehicles and which is designed to transmit a frequency-modulated radar wave and receive a radar wave reflected from a target object to determine the distance to and relative speed of the target object.

2 Background Art

Recently, a radar is tried to be used in an anti-collision device of automotive vehicles. FM-CW (frequency-modulated continuous wave) radars designed to measure both the distance to and relative speed of a target are proposed for ease of miniaturization and reduction in manufacturing cost thereof.

Typical FM-CW radars transmit a radar signal Ss, as indicated by a solid line in FIG. 12(a), which is frequency-modulated with a triangular wave to have a frequency increased and decreased cyclically in a linear fashion and receive a radar return of the transmitted radar wave from a target. The received signal Sr, as indicated by a broken line, undergoes a delay of time Td the radar signal takes to travel from the radar to the target and back, that is, time depending upon the distance to the target, so that the received signal Sr is doppler-shifted in frequency by Fd depending upon the relative speed of the target. The received signal Sr and the transmitted signal Ss are mixed together by a mixer to produce a beat signal Sb, as shown in FIG. 12(b), whose frequency is equal to a difference in frequency between the received signal Sr and the transmitted signal Sb. If the frequency of the beat signal Sb when the frequency of the transmitted signal Ss is increased, which will be referred to below as a beat frequency in a modulated frequency-rising range, is defined as fu, the frequency of the beat signal Sb when the frequency of the transmitted signal Ss is decreased, which will be referred to below as a beat frequency in a modulated frequency-falling range, is defined as fd, then distance R to and relative speed V of the target may be expressed as:

$$R = \frac{c \cdot T}{8 \cdot \Delta T} \cdot (fu + fd) \quad (1)$$

$$V = \frac{c}{4 \cdot Fo} \cdot (fu - fd) \quad (2)$$

where c is the propagation speed of a radio wave, T is a cycle of the triangular wave for modulation of the transmitted signal Ss, $\Delta F$ is a variation in frequency of the transmitted signal Ss, and Fo is a central frequency of the transmitted signal Ss.

In order to use such an FM-CW radar in automotive vehicles, it is necessary to design the FM-CW radar so that it can detect a target located a maximum of 100 to 200 meters away in a resolution in range of at least several meters.

The resolution in range of the FM-CW radar may be expressed by the equation (3) below.

$$\Delta R = \frac{c}{2 \cdot \Delta F} \quad (3)$$

The equation (3) shows that establishment of the resolution in range of several meters requires the frequency variation $\Delta F$ of the order of 100 MHz. Assuring such a frequency variation requires setting the central frequency of the transmitted signal Ss to within a frequency band of several tens GHz to several hundreds GHz (i.e., a millimeter wave).

For instance, when the frequency variation $\Delta F$ is 100 MHz, and the cycle T is 1 ms and when the relative speed V of the target is zero (i.e., fu=fd), and the distance R to a target object is 100 m, the beat frequencies fu and fd will be 133 KHz. When the target object is present within 100 m, the beat signal Sb of less than 133 KHz is produced. When the relative speed V is not zero (0), the beat signal Sb is produced which has a doppler-shifted frequency increasing and decreasing across the frequency when the relative speed V is zero (0). Specifically, the use of the FM-CW radar in automotive vehicles requires the ability to produce a beat signal of several tens KHz to several hundreds KHz.

Usually, in high-frequency mixers handing a signal in a high frequency band such as a millimeter wave, AM-FM conversion-caused noises including frequency components of fluctuation in signal strength and/or 1/f noises having the strength inversely proportional to the frequency are superimposed on a mixer output. The AM-FM conversion-caused noises and the 1/f noises, which will be referred to as low frequency noises below, are relatively great in strength in the same frequency band as that of the beat signal Sb (i.e., several tens KHz to several hundreds KHz), thus resulting in a deterioration in signal-to-noise (SN) ratio of the beat signal Sb.

Japanese Patent First Publication No. 5-40169 discloses, as shown in FIG. 13, an FM-CW radar 110 consisting of a high-frequency oscillator 112, a modulating signal generator 126, a transmitting antenna 116, a receiving antenna 120, a distributor 118, a high-frequency mixer 122. The high-frequency oscillator 112 produces a high-frequency output signal Ss. The modulating signal generator 126 generates a modulating signal for modulating the frequency of the output signal Ss so as to take the form of a triangular wave. The transmitting antenna 116 transmits the output signal Ss in the form of a radar wave. The receiving antenna 120 receives a radar return of the transmitted radar wave from a target object to provide an input signal Sr to the high-frequency mixer 122. The high-frequency mixer 122 mixes a local signal L from the distributor 118 with the input signal Sr from the receiving antenna 120 to produce a beat signal Sb. The FM-CW radar also includes a second oscillator 136, a switching circuit 138, band-pass filters 132 and 140, and an intermediate-frequency mixer 134. The second oscillator 136 produces a switching signal with a frequency more than two times that of the beat signal Sb. The switching circuit 138 is responsive to the switching signal from the second oscillator 136 to permit the input signal Sr from the receiving antenna 120 to be supplied to the high-frequency mixer 122 cyclically. The high-frequency mixer 122 mixes the local signal L with the input signal Sr from the receiving antenna 120 to produce the beat signal Sb. The band-pass filter 132 passes only a frequency component of the beat signal Sb produced in a frequency domain corresponding to the frequency of the switching signal. The intermediate-frequency mixer 134 mixes the frequency component transmitted through the band-pass filter 132 with the switching signal which is produced by the second oscillator 136 and shaped by the band-pass filter 140 to have the beat signal Sb fall into a desired frequency band of several tens KHz to several hundreds KHz.

The frequency Fr of the input signal Sr received by the receiving antenna 120 at time t is shifted from the frequency Ft of the output signal Ss transmitted at time t by the beat frequency fu which depends upon the distance to and relative speed of the target object reflecting the radar wave. The frequency spectrum of the input signal Sr outputted from the switching circuit 138, thus, has sidebands, as shown in FIG. 14(a), shifted from the central frequency Fr by the frequency Fs of the switching signal outputted from the second oscillator 136, respectively. The input signal Sr is, as described above, mixed with the local signal L by the high-frequency mixer 122 to produce the beat signals Sb having a frequency component corresponding to a difference in frequency between the signals Sr and L.

FIG. 14(b) shows the frequency spectrum of the input signal Sr (solid line) and the frequency spectrum of the local signal L (broken line).

The frequency spectrum of the beat signal Sb produced by the high-frequency mixer 122, as can be seen from the drawing, has signal components with the beat frequency fu (=|Fr−Ft|) corresponding to a difference between the central frequency of the input signal Sr and the frequency of the local signal L and with the frequencies Fs±fu that correspond to the differences in frequency between sideband components of the input signal Sr and the local signal L. These signal components are shown in FIG. 15.

In the following discussion, one of components of the beat signal Sb which has the beat frequency fu will be referred to as a fundamental component, and the other components having the frequencies Fs±fu will be referred to as harmonic components.

In the FM-CW radar 110, production of the beat signal Sb through the high-frequency mixer 122 which has the harmonic components within a frequency domain of a few MHz almost insensitive to lower frequency noises is achieved by setting the frequency of the switching signal to a few MHz. The intermediate-frequency mixer 134 which adjusts the harmonic components to fall within a desired frequency band may handle signals much lower in frequency than the millimeter waves and is smaller in lower frequency noises superimposed on an output thereof than the high-frequency mixer 122, thus resulting in an improved SN ratio of the beat signal Sb.

It is, however, found that the switching circuit 138 is subjected to significant changes in input/output impedance in on- and off-states, which adversely affects the activities of the high-frequency mixer 122 connected to the switching circuit 138. Specifically, since the high-frequency mixer 122 is usually so adjusted as to provide a matched input impedance when the switching circuit 138 is in the on-state, the impedance matching is not established when the switching circuit 138 is in the off-state, thereby resulting in instability of an operation of the high-frequency mixer 122, which may cause the high-frequency mixer 122 to be oscillated.

In order to avoid the above problem, the publication No. 5-40169 teaches interposing an isolator (circulator) between the switching circuit 138 and the high-frequency mixer 122 or use of a low noise amplifier as the switching circuit 138 which functions as an isolator.

The drawback is, however, encountered in that the isolator dampens the input signal Sr to the high-frequency mixer 122, thus resulting in deterioration in radar sensitivity. Further, when the lower noise amplifier is used as the switching circuit 138, it does not dampen the input signal Sr as much as by the isolator, but an isolation effect is not obtained which is enough to eliminate the influence of variation in impedance of the switching circuit 138 on the high-frequency mixer 122.

The above publication also teaches interposing a switching circuit 138 between the high-frequency oscillator 112 and the transmitting antenna 116, but it is necessary to install an isolator between the high-frequency oscillator 112 and the switching circuit 138 in order to eliminate the influence of variation in impedance of the switching circuit 138 on the high-frequency mixer 122, which will lead to the same problem encountered in the structure in which the switching circuit 138 is disposed between the receiving antenna 120 and the high-frequency mixer 122.

SUMMARY OF THE INVENTION

It is therefore a principal object of the present invention to avoid the disadvantages of the prior art.

It is another object of the present invention to provide a radar apparatus with improved sensitivity which is capable of eliminating the influence of low frequency noises of a high-frequency mixer without attenuating high-frequency signals greatly.

In the study of means to alleviate the problems encountered in the conventional radar shown in FIG. 13, the inventors of this application simulated the radar 10 shown in FIG. 13 in which an amplitude modulator is installed instead of the switching circuit 38 to find the relation between the modulation index provided by the amplitude modulator and the signal strength of the beat signal. FIGS. 8(a) to 11 show results of the simulations.

The modulation index is an index of the ratio of a variation in amplitude of a signal after being modulated in amplitude to the amplitude of the original signal. When the modulation index is one (1), the strength of the amplitude-modulated signal will be zero (0) when the amplitude thereof shows a minimum value. This case applies to the conventional radar structure shown in FIG. 13 in which the so-called on-off control of the received signal is performed. When the modulation index is zero (0), it means that no amplitude modulation is performed.

In the simulations, the received signals Sr inputted to the high-frequency mixer 122, the local signal L, and the beat signal Sb were produced in a computer. The waveforms of the received signal Sr and the local signal L are expressed by equations (4) and (5) below. The waveform of the beat signal Sb produced by the high-frequency mixer 122 is, as shown in equation (6), expressed by adding the product of the received signal Sr and the local signal L to a low-frequency noise Nf such as the 1/f noise.

$$Sr(t)=Ar\{1+m\cdot\cos(2\pi\cdot Fs\cdot t+\theta s)\}\times\cos\{2\pi\cdot Ft\cdot(t-td)+\theta t\} \quad (4)$$

$$L(t)=Al\cdot\cos(2\pi\cdot Ft\cdot t+\theta t) \quad (5)$$

$$Sb(t)=Sr(t)\cdot L(t)+Nf \quad (6)$$

where Ar is the strength of the received signal Sr, Al is the strength of the local signal L, θt and Ft are an initial phase of the transmitted signal (i.e., the local signal L) and the frequency thereof at time t, respectively, θs and Fs are an initial phase of a modulating signal used in modulating the received signal Sr and the frequency thereof, respectively, td is a time interval from transmission of the radar wave and reception of a radar return from a target object, and m is the modulation index provided by the amplitude modulator.

It is assumed that the frequency Ft of the transmitted signal Ss (i.e., the local signal L) varies in the form of a triangular wave, as shown in FIG. 12(a), whose central frequency Fo=59.5 GHz, frequency variation ΔF=100 MHz, and modulation cycle T=1 ms, the frequency Fs of the modulating signal is 1 MHz, and the time interval td is determined on the assumption that a target object is present within 100 m.

FIGS. 8(a) and 8(b) show spectra determined by frequency-analyzing the waveform of the beat signal Sb derived by the equation (6) using the fast Fourier transform. FIG. 8(a) illustrates for the case where the modulation index m=1. FIG. 8(b) illustrates for the case where the modulation index m=0.1.

FIG. 9 illustrates the signal strength of a signal component that is a harmonic component (frequency Fs+fu) of one of a pair of peaks in the spectra of FIGS. 8(a) and 8(b), the signal strength of a noise component that is the average of noises over a range of ±5 kHz across the one of the peaks, the SN ratio that is the ratio of the signal component to the noise component for different values of the modulation index m between 0.05 to 1.0. Note that the SN ratio of a harmonic component with the frequency Fs-fu to a noise component is substantially the same as the one in FIG. 9.

FIG. 9 shows that the strengths of the signal component and the noise component both decrease with a decrease in modulation index m, while the SN ratio hardly changes. The inventors of this application have found that the SN ratio of the harmonic components of the beat signal Sb is insensitive to the modulation index m.

According to one aspect of the invention, there is provided a radar apparatus which comprises: (a) a high-frequency generating circuit generating a high-frequency signal which is so modulated in frequency as to vary with time in a linear fashion and splitting the high-frequency signal into an output signal to be transmitted as a radar wave and a local signal; (b) a high-frequency mixer mixing an input signal that is a return of the radar wave from a target object with the local signal produced by the high-frequency generating circuit to produce a beat signal consisting of a frequency component corresponding to a difference in frequency between the output signal and the input signal; (c) a modulating signal producing circuit producing a modulating signal which is two or more times greater in frequency than a fundamental component of the beat signal as a function of a distance to and a relative speed of the target object; and (d) an amplitude modulating circuit modulating an amplitude of at least one of the output signal, the input signal, and the local signal in accordance with the modulating signal so that a modulation index falls within a range of zero (0) to one (1).

When the input signal is subjected to amplitude-modulation, the input signal will have sidebands, as described in FIGS. 14(a) and 14(b), shifted on both sides of the frequency of the input signal by the frequency of the modulating signal.

When the output signal is subjected to the amplitude-modulation, it will cause the output signal to have sidebands shifted on both sides of the frequency Ft of the output signal by the frequency Fs of the modulating signal. This causes the input signal to have the frequency shifted from the frequency Ft by the beat signal fu. The input signal and the local signal, thus, have the same frequencies as the ones shown in FIG. 14(b).

Similarly, when the local signal is subjected to the amplitude-modulation, it will cause the spectrum of the local signal to have sidebands shifted on both sides of the frequency of the local signal by the frequency Fs of the modulating signal, similar to the one as indicated by the solid line in FIG. 14(b). The input signal to have the frequency shifted from the frequency Ft by the beat signal fu, similar to the one as indicated by the broken line in FIG. 14(b).

Therefore, when any of the output signal, the input signal, and the local signal is modulated in amplitude, it will cause the beat signal produced by the high-frequency mixer to have harmonic components (Fs±fu). The frequency Fs of the modulating signal is two or more times the frequency fu of the fundamental component of the beat signal, thus causing the harmonic components to be produced without overlapping with the fundamental component. This allows the harmonic components to be extracted from the beat signal accurately. Specifically, the beat frequency fu used in calculating the distance to and relative speed of a target object is determined using the harmonic components with an improved SN ratio.

The modulation index provided by the amplitude modulating circuit lies within the range of zero (0) to one (1). This minimizes the influence of variation in impedance of the amplitude modulating circuit on other circuit components, thereby allowing the radar apparatus to be constructed without use of an isolator (circulator) which is needed in the prior art structure shown in FIG. 13.

In the preferred mode of the invention, at least one of a band-pass filter which removing signal components of the beat signal other than harmonic components in the vicinity of the frequency of the modulating signal and a narrow-band amplifier which amplifies the harmonic components of the beat signal is further provided.

An arithmetic circuit is provided which determines at least one of the distance to and the relative speed of the target object based on the fundamental component of the beat signal produced by the high-frequency mixer.

An intermediate frequency mixer may be provided which mixes the beat signal produced by the-high frequency mixer with the modulating signal from the modulating signal producing circuit to produce a second beat signal. At least one of a low-pass filter which removes signal components of the second beat signal produced by the intermediate frequency mixer other than the fundamental component and a low-frequency amplifier which amplifies the fundamental component may be provided. The arithmetic circuit determines at least one of the distance to and the relative speed of the target object based on a fundamental component of the second beat signal produced by the intermediate-frequency mixer.

The modulating signal produced by the modulating signal producing circuit consists of a single frequency component. The modulation index provided by the amplitude modulating circuit is greater than or equal to 0.1, preferably 0.2 and less than or equal to 0.5.

The amplitude modulating circuit includes a variable amplifier which changes a signal amplification factor with the modulating signal or a variable attenuator which changes a signal attenuation factor with the modulating signal.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
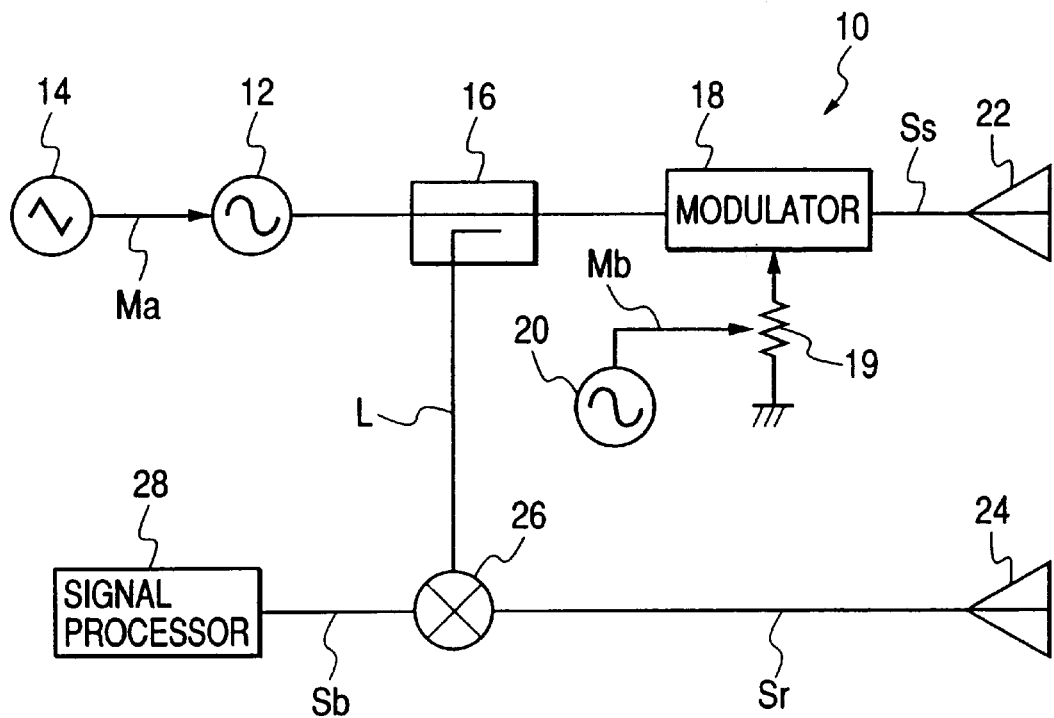
FIG. 1 is a block diagram which shows a radar apparatus according to the present invention.

Referring now to the drawings, particularly to FIG. 1, there is shown an FM-CW radar apparatus 10 according to the present invention which may be employed in automotive anti-collision system or automotive radar cruise control system to detect the presence of obstacles in front of a vehicle.

The radar apparatus 10 generally includes a voltage-controlled oscillator 12, a triangular wave generator 14, a distributor 16, a sine wave oscillator 20, a modulation strength regulator 19, an amplitude modulator 18, a transmitting antenna 22, a receiving antenna 24, a high-frequency mixer 26, and a signal processor 28.

The voltage-controlled oscillator 12 produces a high-frequency signal in a millimeter wave band. The triangular wave generator 14 provides a modulating wave Ma in the form of a triangular wave to modulate the frequency of the high-frequency signal to be outputted from the voltage-controlled oscillator 12 in a linear fashion. The distributor 16 splits in power the high-frequency signal produced by the voltage-controlled oscillator 12 into an output signal Ss and a local signal L. The sine wave oscillator 20 produces a modulating signal Mb in the form of a sine wave and outputs it to the modulation strength regulator 19. The modulation strength regulator 19 regulates the strength (i.e., the amplitude) of the modulating signal Mb. The amplitude modulator 18 modulates in amplitude the output signal Ss inputted from the distributor 16 in accordance with the strength-regulated modulating signal Mb. The transmitting antenna 22 transmits the output signal Ss as a radar wave to a frontal obstacle detection range. The receiving antenna 24 receives a radar return of the radar wave from an object present in the obstacle detection range to produce an input signal Sr. The high-frequency mixer 26 mixes the local signal L with the input signal Sr to produce a beat signal Sb consisting of a frequency component corresponding to the difference in frequency between the signals Sr and L. The signal processor 28 analyzes the beat signal Sb to determine the distance to and relative speed of the target object in the obstacle detection range. The signal processor 28 includes a microcomputer which consists of a CPU, a ROM, and a RAM and also includes an A/D converter and an arithmetic logic unit which takes the fast Fourier transform (FFT) of data inputted through the A/D converter.

Figure 2:
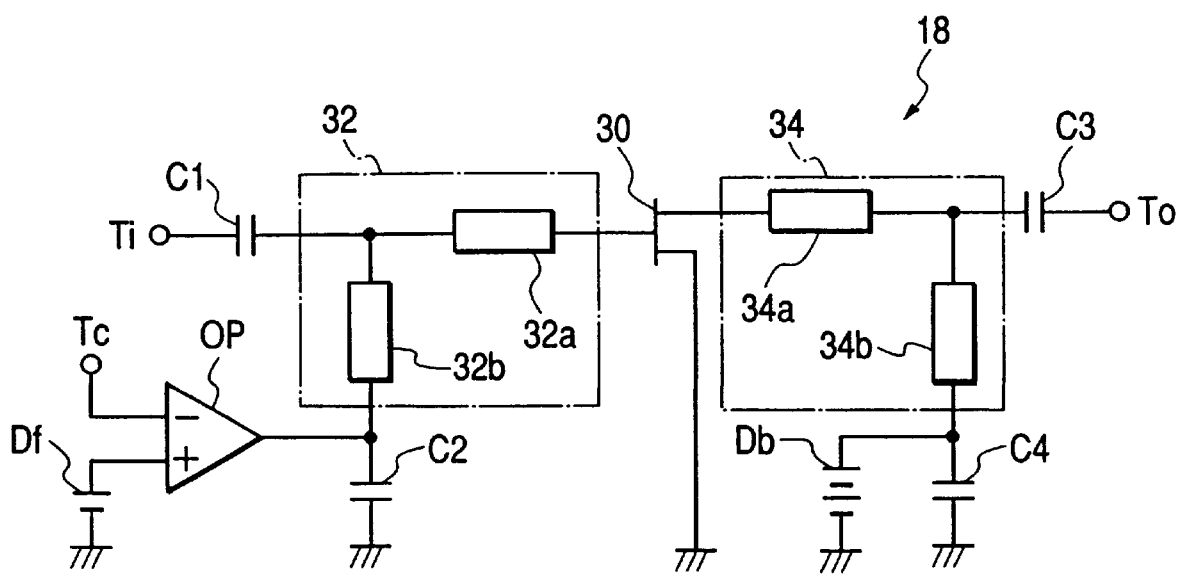
FIG. 2 is a block diagram which shows a structure of an amplitude modulator used in the radar apparatus of FIG. 1.

The amplitude modulator 18, as shown in FIG. 2, generally includes a high-frequency transistor 30, an input matching circuit 32, and an output matching circuit 34. The transistor 30 is connected at a source thereof to ground. The input matching circuit 32 consists of a transmission line 32a and a stub 32b. The transmission line 32a is connected at one end to a gate of the transistor 30 and at the other end to a signal input terminal Ti through a dc blocking capacitor C1. The stub 32b is connected at one end to a capacitor-side terminal of the transmission line 32a and at the other end to ground through a capacitor C2. The output matching circuit 34 consists of a transmission line 34a and a sub 34b. The transmission line 34a is connected at one end to a drain of the transistor 30 and at the other end to a signal output terminal To through a dc blocking capacitor C3. The stub 34b is connected at one end to a capacitor-side terminal of the transmission line 34a and at the other end to ground through a capacitor C4.

The amplitude modulator 18 also includes a reference power supply Df, an operational amplifier OP, and a bias power supply Db. The operational amplifier OP is connected at an inverting input terminal to an amplification factor control terminal Tc and at a non-inverting input terminal to the reference power supply Df and applies a bias voltage to the gate of the transistor 30 in accordance with the voltage applied to the amplification factor control terminal Tc. The bias power supply Db is connected to the stub 34b of the output matching circuit 34 to apply a bias voltage to the drain of the transistor 30.

To the signal input terminal Ti, the output signal Ss is inputted from the distributor 16. To the amplification factor control terminal Tc, the modulating signal Mb is inputted from the sine wave oscillator 20 through the modulation strength regulator 19. An output from the signal output terminal To is supplied to the transmitting antenna 22. The bias voltage applied to the gate of the transistor 30 changes with the modulating signal Mb inputted to the amplification factor control terminal Tc, thereby resulting in a change in a signal amplification factor of the transistor 30. This causes the output signal Ss inputted to the transistor 30 from the signal input terminal Ti to be modulated in amplitude in accordance with the modulating signal Mb, which is, in turn, outputted from the signal output terminal To.

The modulation strength regulator 19 regulates the strength of the modulating signal Mb so that the modulation index m of the amplitude modulator 18 may fall within a range of $0<m<1.0$ (preferably, $0.1 \leq m \leq 0.5$). In this embodiment, m=0.5.

The voltage-controlled oscillator 12 produces a high-frequency signal which is modulated in frequency in the form of a triangular wave in accordance with the modulating signal Ma inputted from the triangular wave generator 14. The distributor 16 splits in power the high-frequency signal from the voltage-controlled oscillator 12 into the output signal Ss and the local signal L. The output signal Ss is further modulated in amplitude by the amplitude modulator 18 in accordance with the modulating signal Mb produced by the sine wave oscillator 20 and then transmitted from the transmitting antenna 22 as a radar wave.

Upon reception of a radar return of the output signal Ss from a target object through the receiving antenna 24, the high-frequency mixer 26 mixes the input signal Sr from the receiving antenna 24 with the local signal L to produce the beat signal Sb consisting of a fundamental component having the frequency fu as a function of the distance to and relative speed of the target object and harmonic components having the frequencies Fs±fu depending upon the modulating frequency Fs of the modulating signal Mb.

The signal processor 28 A-D converts the beat signal Sb in the modulated frequency-rising and —falling ranges and takes the fast Fourier transform thereof to determine the frequency spectrum of the beat signal Sb. The signal processor 28 extracts from the frequency spectrum frequencies Fs±fu and Fs±fd of harmonic components in the modulated frequency-rising and —falling ranges to determine the beat frequencies fu and fd, respectively, and calculates the distance R to and relative speed V of the target object based on the beat frequencies fu and fd using the above equations (1) and (2).

The output signal Ss is, as described above, modulated in amplitude with the modulating signal Mb to produce sidebands of frequencies Ft±Fs. The beat signal Sb produced with a mixture of the input signal Sr having the above sidebands and the local signal L, thus, has not only the fundamental component with the frequency fu, but also the harmonic components with the frequencies Fs±fu. Accordingly, the influence of low-frequency noises on the harmonic components of the beat signal Sb is eliminated by adjusting the frequency Fs of the modulating signal Mb so as to fall within a range of several MHz to several tens MHz (e.g., 1 MHz to 10 MHz) which is two or more times the frequency fu (e.g., 200 KHz at the most) of the fundamental component of the beat signal Sb, thereby resulting in great improvement of the SN ratio of the harmonic components of the beat signal Sb as compared with that of the fundamental component thereof. This allows the signal processor 28 to perform operations using the harmonic components of the beat signal Sb with the improved SN ratio, so that the beat frequencies fu and fd can be determined with high accuracy, which will results in high accuracy in determining the distance R to and relative speed V of the target object.

Figure 13:
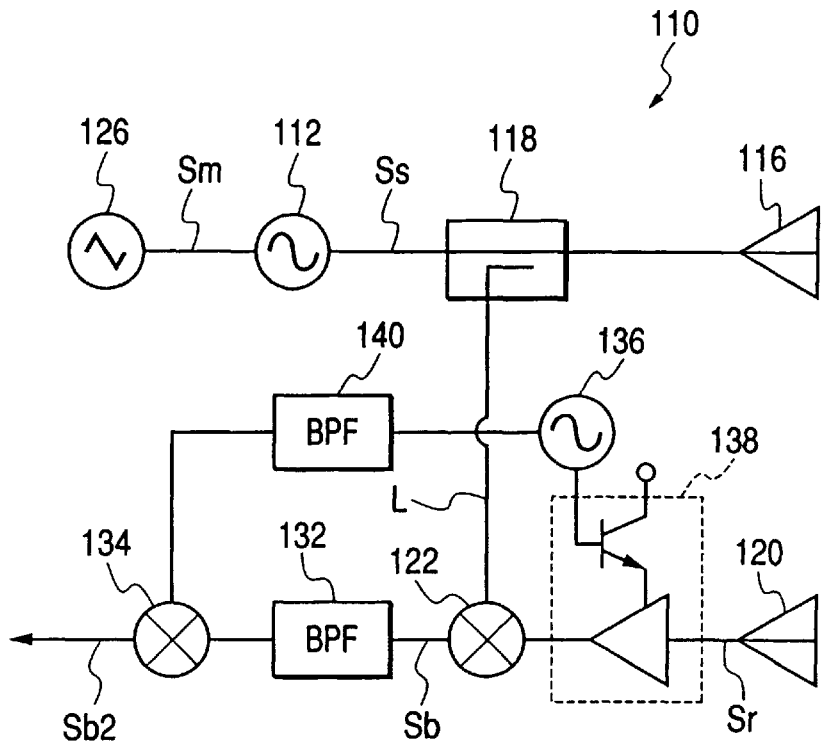
FIG. 13 is a block diagram which shows a conventional FM-CW radar.
Figure 15:
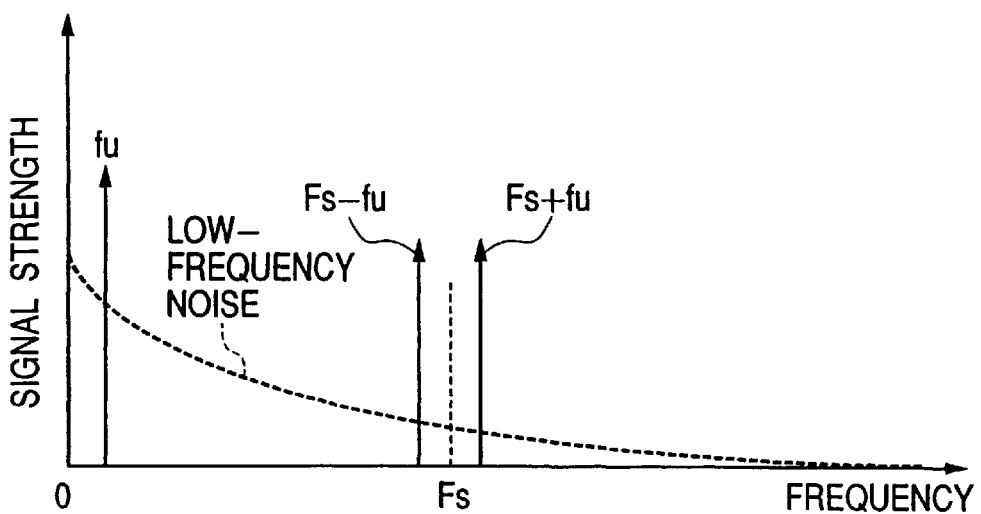
FIG. 15 shows the relation between the strength of components of beat signal and frequencies thereof.
Figure 14A:
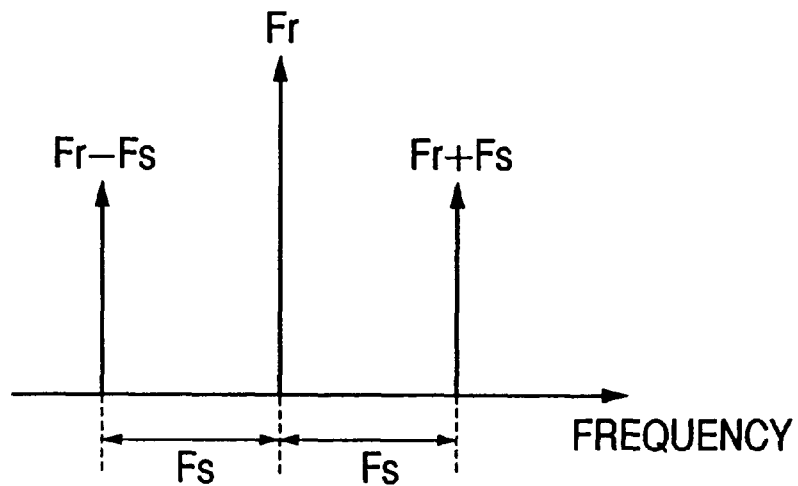
FIG. 14(a) shows the spectrum of a received signal in the FM-CW radar of FIG. 13.
Figure 14B:
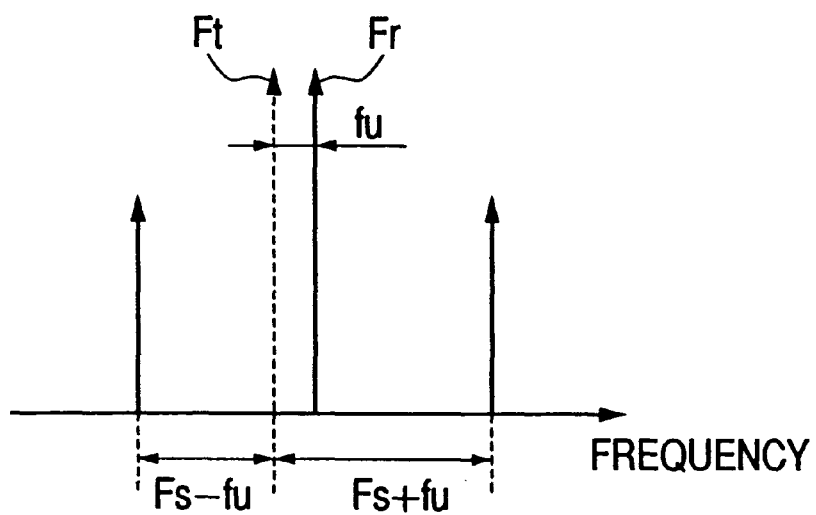
FIG. 14(b) shows spectra of a received signal and a local signal (i.e., a transmitted signal) in the FM-CW radar of FIG. 13.

The modulation index m of the amplitude modulator 18 is, as described above, 0.5, thus causing the amplitude of a modulated signal to be decreased by half to reduce a change in impedance in the amplitude modulator 18 as compared with a conventional radar, like the one as shown in FIG. 13, which receives an input signal (i.e, a radar return) intermittently using a switching circuit (i.e., the modulation index m=1). This eliminates the need for expensive parts such as circulators or isolators which contribute to a great insertion loss and also results in a decrease in loss of the amplitude modulator 18, which improves the sensitivity of the radar apparatus 10, thereby resulting in an increase in radar range. The radar apparatus 10 may, thus, be constructed with a monolithic microwave IC.

In this embodiment, the adjustment of amplification factor of the transistor 30 of the amplitude modulator 18 is, as described above, achieved by changing the bias voltage applied to the gate of the transistor 30, but may alternatively be achieved by changing the bias voltage applied to the drain of the transistor 30.

Figure 3:
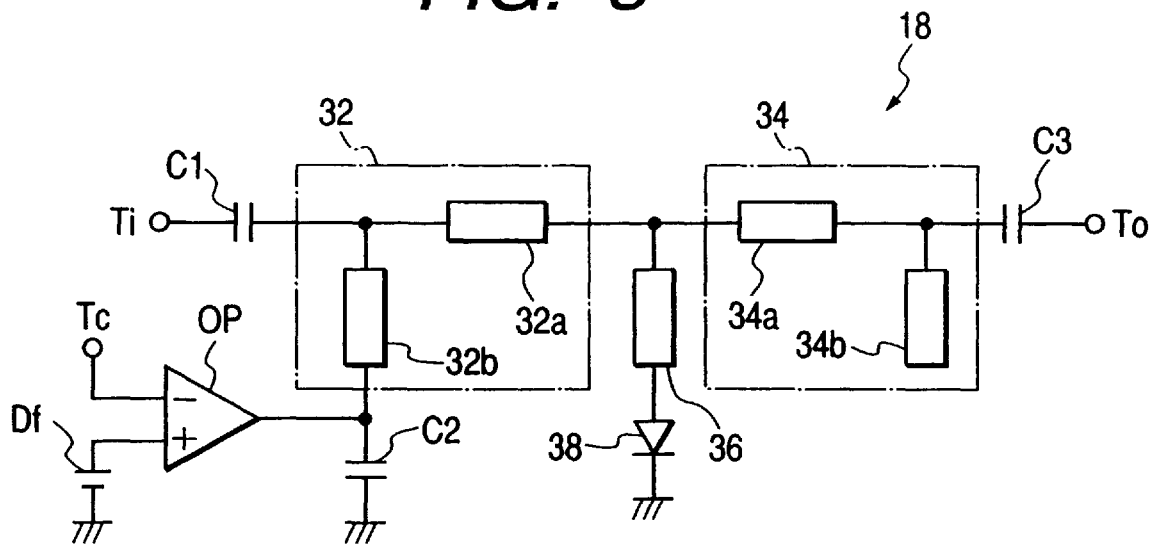
FIG. 3 is a block diagram which shows a modification of the amplitude modulator of FIG. 2.

The amplitude modulator 18 is implemented with a variable amplifier having the signal amplification factor which changes with the modulating signal Mb, but may be made with a variable attenuator having the attenuation factor which changes with the modulating signal Mb. For example, the amplitude modulator 18 may be designed to have a circuit structure, as shown in FIG. 3, in which the transmission line 32a of the input matching circuit 32 is connected directly to the transmission line 34a of the output matching circuit 34, a junction of the transmission lines 32a and 34a is connected to ground through a stub 36 and a diode 38, and the stub 34b is opened at one end thereof without being connected to ground through the bias power supply Db and the capacitor C4, as shown in FIG. 2. In this structure, the bias voltage applied to the diode 38 is changed with the modulating signal Mb inputted to the amplification factor control terminal Tc, so that the permeability of the diode 38 to permit a millimeter wave to pass therethrough is changed, that is, that the ratio of a signal inputted to the signal input terminal Ti to a signal outputted from the signal output terminal To (i.e., the attenuation factor) is changed. Specifically, the output signal Ss inputted to the signal input terminal Ti is modulated in accordance with the modulating signal Mb inputted to the amplification factor control terminal Tc.

The voltage-controlled oscillator 12 and the triangular wave generator 14 for frequency-modulating the high-frequency signal generated by the voltage-controlled oscillator 12 may alternatively be built into a single module. The module may also be so designed as to output the output signal Ss and the local signal L from separate terminals, thereby eliminating the need for the distributor 16.

Figure 4:
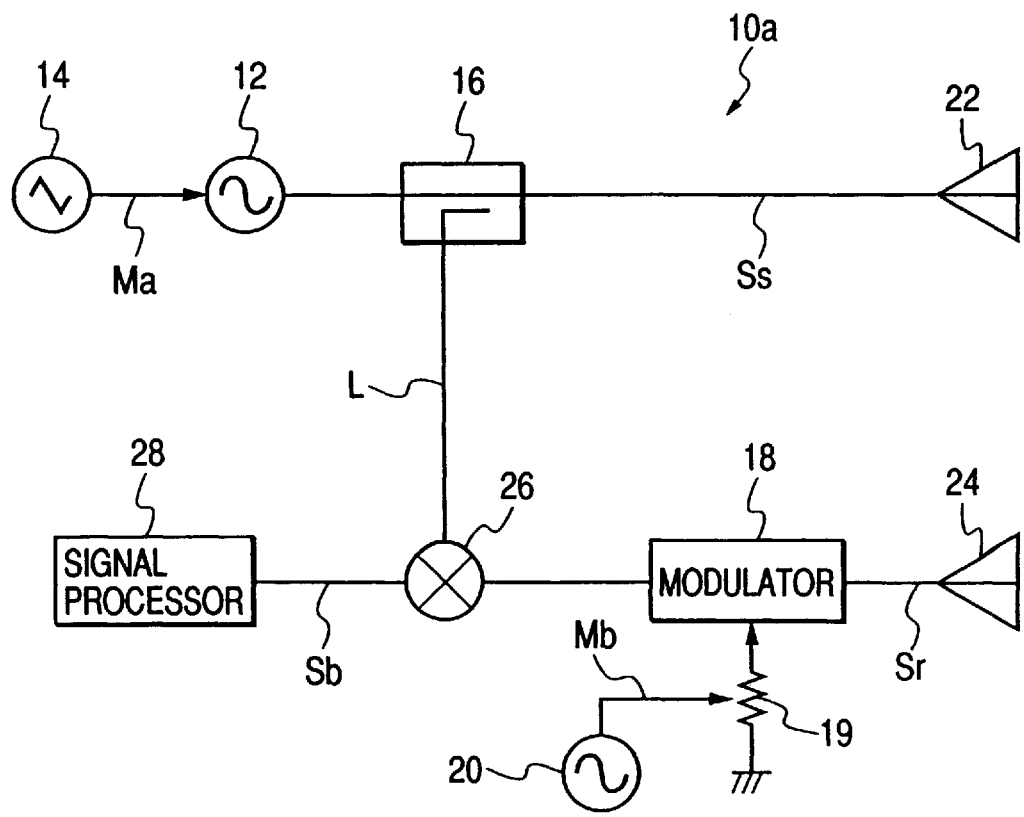
FIG. 4 is a block diagram which shows a radar apparatus according to the second embodiment of the invention.

FIG. 4 shows a radar apparatus 10a according to the second embodiment of the invention. The same reference numbers as employed in the first embodiment refer to the same parts, and explanation thereof in detail will be omitted here.

The radar apparatus 10a has the amplitude modulator 18 disposed between the receiving antenna 24 and the high-frequency mixer 26 rather than between the distributor 16 and the transmitting antenna 22 for modulating the input signal Sr in amplitude. Other arrangements are identical with those of the first embodiment.

In operation, the output signal Ss emerging from the distributor 16 is radiated directly from the transmitting antenna as a radar wave. The input signal Sr from the receiving antenna 24 is so modulated by the amplitude modulator 18 as to show the modulation index m falling within a range from zero (0) to one (1), preferably $0.1 \leq m \leq 0.5$. This causes the input signal Sr to have sidebands of frequencies Fr±Fs.

The amplitude-modulated input signal Sr is mixed by the high-frequency mixer 26 with the local signal L to produce the beat signal Sb consisting of a fundamental component having the frequency fu and harmonic components having the frequencies Fs±fu.

Figure 5:
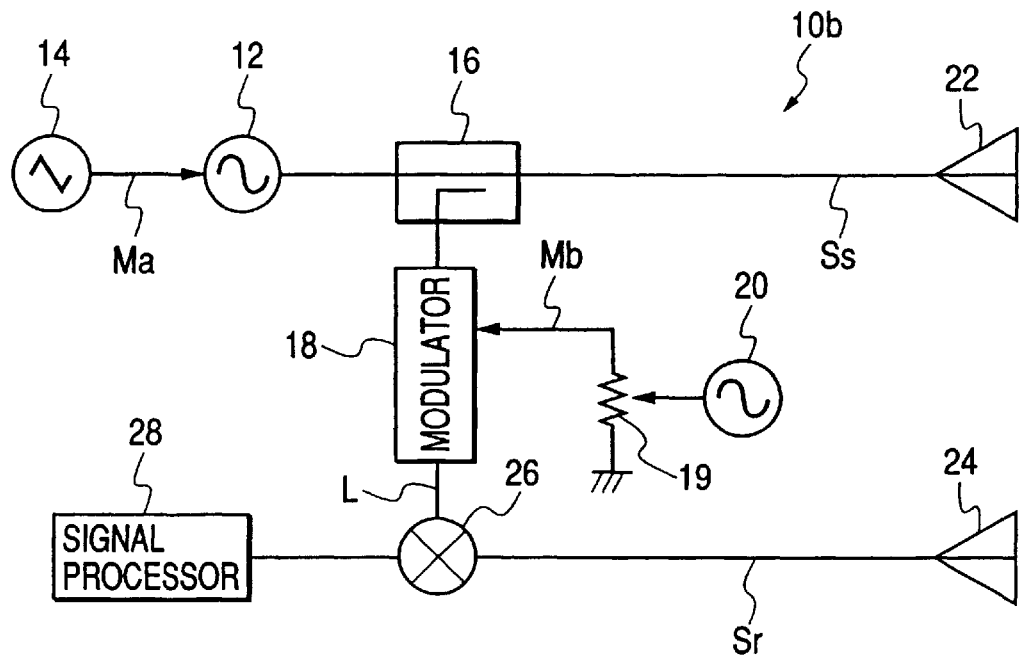
FIG. 5 is a block diagram which shows a radar apparatus according to the third embodiment of the invention.

FIG. 5 shows a radar apparatus 10b according to the third embodiment of the invention which is different from the first embodiment in that the amplitude modulator 18 is interposed between the distributor 16 and the high-frequency mixer 26 for modulating the amplitude of the local signal L. Other arrangements are identical, and explanation thereof in detail will be omitted here.

In operation, the output signal Ss outputted from the distributor 16 is radiated directly from the transmitting antenna as a radar wave. The input signal Sr from the receiving antenna 24 is supplied directly to the high-frequency mixer 26. The local signal L from the distributor 16 is so modulated in amplitude by the amplitude modulator 18 that the modulation index m falls within a range from zero (0) to one (1), preferably $0.1 \leq m \leq 0.5$. This causes the local signal L to have sidebands of frequencies Fr±Fs.

The amplitude-modulated local signal L is mixed by the high-frequency mixer 26 with the input signal Sr from the receiving antenna 24 to produce the beat signal Sb consisting of the fundamental component having the frequency fu and the harmonic components having the frequencies Fs±fu.

Figure 6:
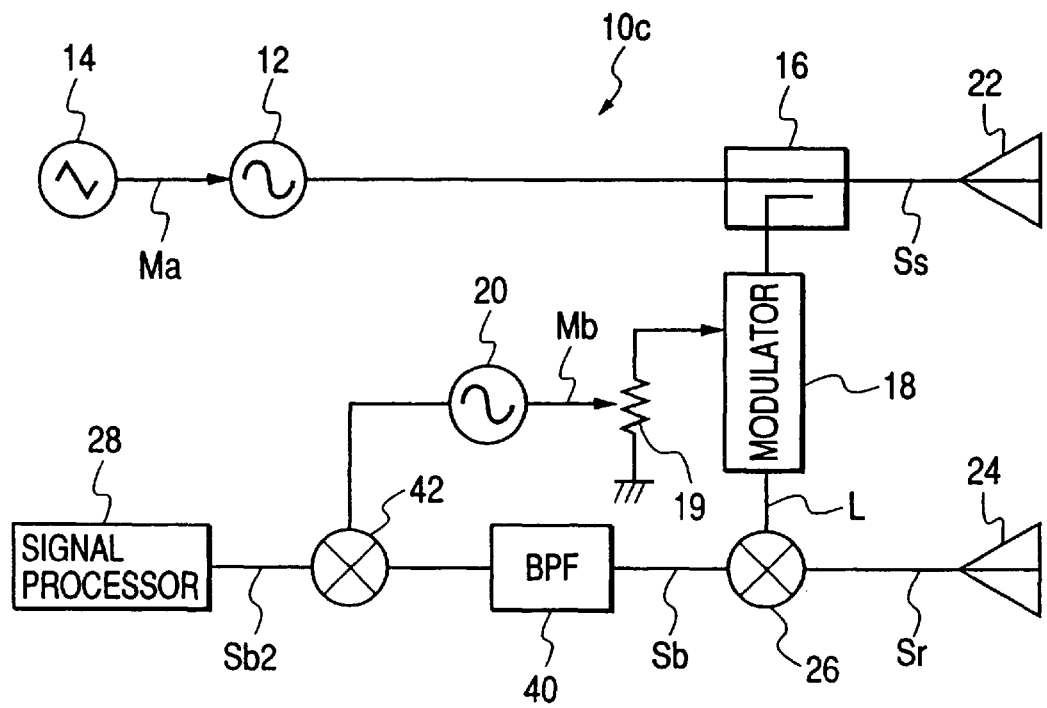
FIG. 6 is a block diagram which shows a radar apparatus according to the fourth embodiment of the invention.

FIG. 6 shows a radar apparatus 10c according to the fourth embodiment of the invention which is different from the third embodiment only in that a band-pass filter 40 and an intermediate-frequency mixer 42 are disposed between the high-frequency mixer 26 and the signal processor 28. Other arrangements are identical, and explanation thereof in detail will be omitted here.

The band-pass filter 40 is connected to an output of the high-frequency mixer 26 to permit harmonic components of the beat signal Sb within a preselected frequency band to pass therethrough. The intermediate-frequency mixer 42 mixes the output from the band-pass filter 40 with the modulating signal Mb generated by the sine wave oscillator 20 to produce a second beat signal Sb2.

The pass band of the band-pass filter 40 has the bandwidth which is two or more times a maximum value of a detectable beat frequency and which lies on each side of the frequency Fs of the modulating signal Mb. The local signal L from the distributor 16 is so modulated in amplitude by the amplitude modulator 18 that the modulation index m falls within a range from zero (0) to one (1), preferably $0.2 \leq m \leq 0.5$.

In operation, of signal components of the beat signal Sb, only harmonic components having frequencies Fs±fu pass through the band-pass filter 40 and then are mixed by the intermediate-frequency mixer 42 with the modulating signal Mb having the frequency Fs to produce the second beat signal Sb2 consisting of the fundamental component with the frequency fu. This allows the signal processor 28 to perform operations using the fundamental component of the second beat signal Sb2 (e.g., several tens to several hundreds kHz), thereby resulting in a simplified structure and a decreased operation time for frequency analysis using the fast Fourier transform (FFT).

The passage of the beat signal Sb through the band-pass filter 40 causes unwanted signal components and low-frequency noises superimposed in the high-frequency mixer 26 to be removed from the beat signal Sb. The frequencies handled by the intermediate-frequency mixer 42 are several tends MHz at the most, and the lower-frequency noises superimposed on the beat signal Sb in the intermediate-frequency mixer 42 are small, thus resulting in an improved SN ratio of the second beat signal Sb2 inputted to the signal processor 28 as compared with the first to third embodiments.

Figure 9:
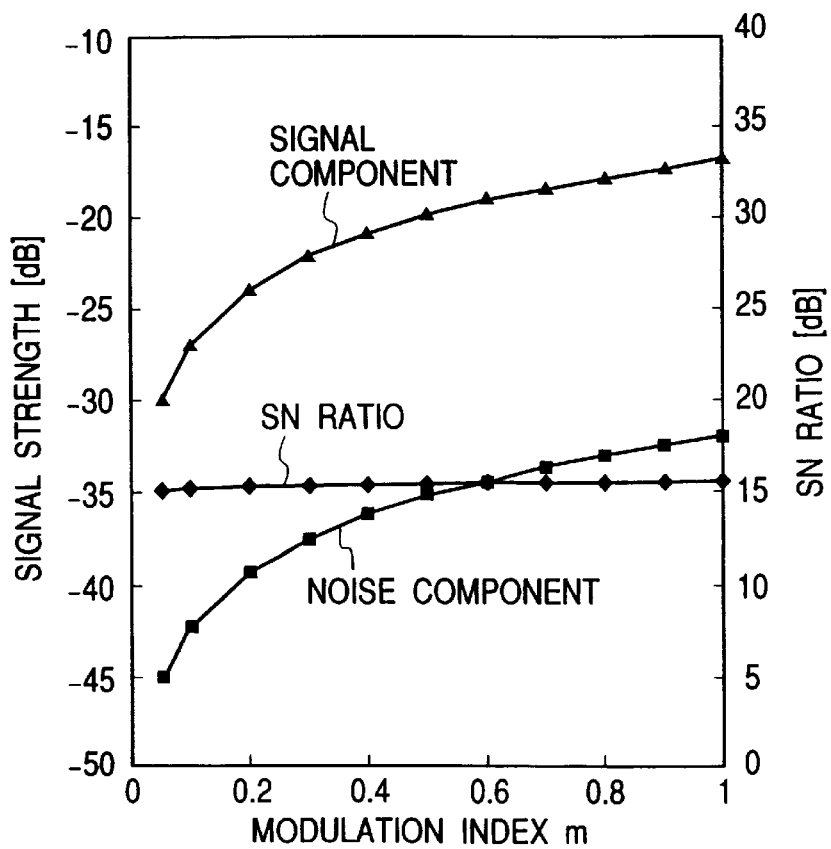
FIG. 9 is a graph which shows the signal strength of a signal component that is a harmonic component (frequency Fs+fu) of one of a pair of peaks in the spectra of FIGS. 8(a) and 8(b), the signal strength of a noise component that is the average of noises over a range of ±5 kHz across the one of the peaks, the SN ratio that is the ratio of the signal component to the noise component for different values of the modulation index m between 0.05 to 1.0.
Figure 10:
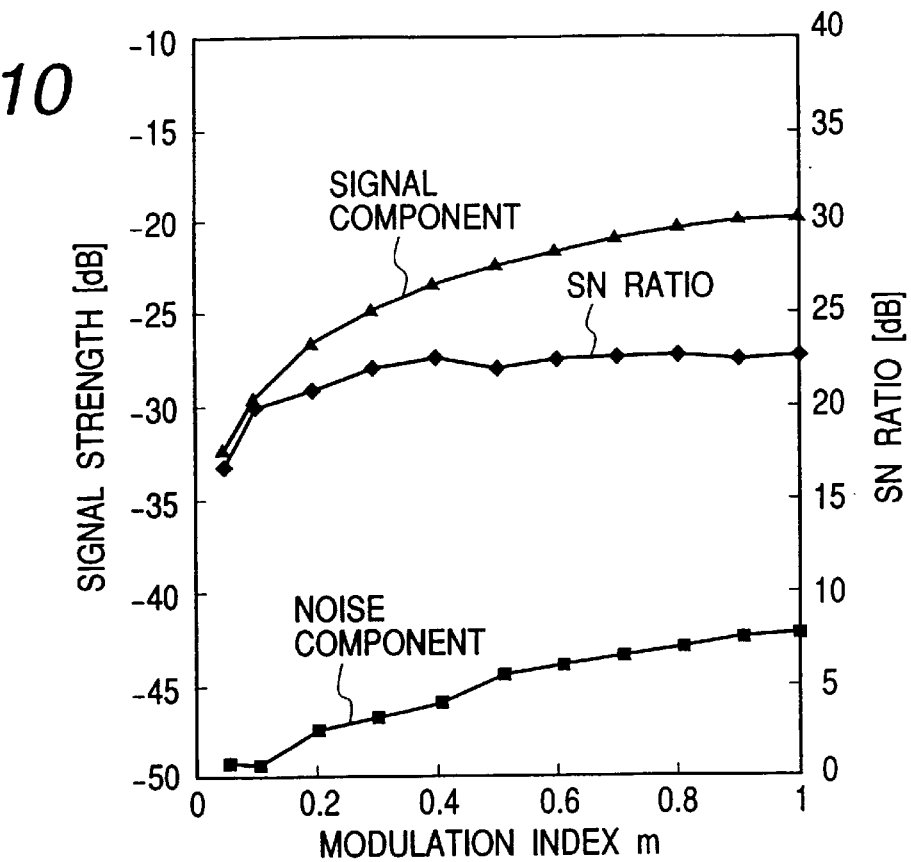
FIG. 10 is a graph which shows the signal strength of an output of an intermediate frequency mixer in the fourth embodiment, the signal strength of a noise component, and the SN ratio that is the ratio of the output of the intermediate frequency mixer to the noise component for different values of the modulation index m between 0.05 to 1.0.

The inventors of this application performed simulations in terms of the relation between the signal strength and the modulation index m. The results are shown in FIG. 10. "▲" indicates the signal strength of an output of the intermediate-frequency mixer 42. "■" indicates the signal strength of a noise component. "♦" indicates the SN ratio that is the ratio of the output of the intermediate-frequency mixer 42 to the noise component for different values of the modulation index m between 0.05 to 1.0. Note that the signal strengths of the output of the intermediate-frequency mixer 42 and the noise component are determined in the same manner as that in FIG. 9.

The band-pass filter 40 used in the simulations is designed to permit signal components of the beat signal Sb derived by the above equation (6) only within a bandwidth of 200 MHz across the frequency Fs (=1 MHz) of the modulating signal Mb to pass therethrough. The intermediate-frequency mixer 42 multiplies an output of the band-pass filter 40 and the modulating signal Mb ($\cos(2 \pi \cdot Fs \cdot t + \theta s)$) together.

It is found from FIG. 10 that when the modulating signal Mb consists of a single frequency component, and the distance to and relative speed of a target object are determined using the second beat signal Sb2 outputted from the intermediate-frequency mixer 42, the modulation index m is preferably more than or equal to 0.2. The decrease in modulation index m causes a variation in impedance in the amplitude modulator 18 to be decreased. Thus, in order to minimize the influence of the variation in impedance on other circuit components, it is advisable that the modulation index m be less than or equal to 0.5.

The band-pass filter 40 may alternatively be omitted or replaced with a narrow-band amplifier for amplifying the harmonic components of the beat signal Sb.

Figure 7:
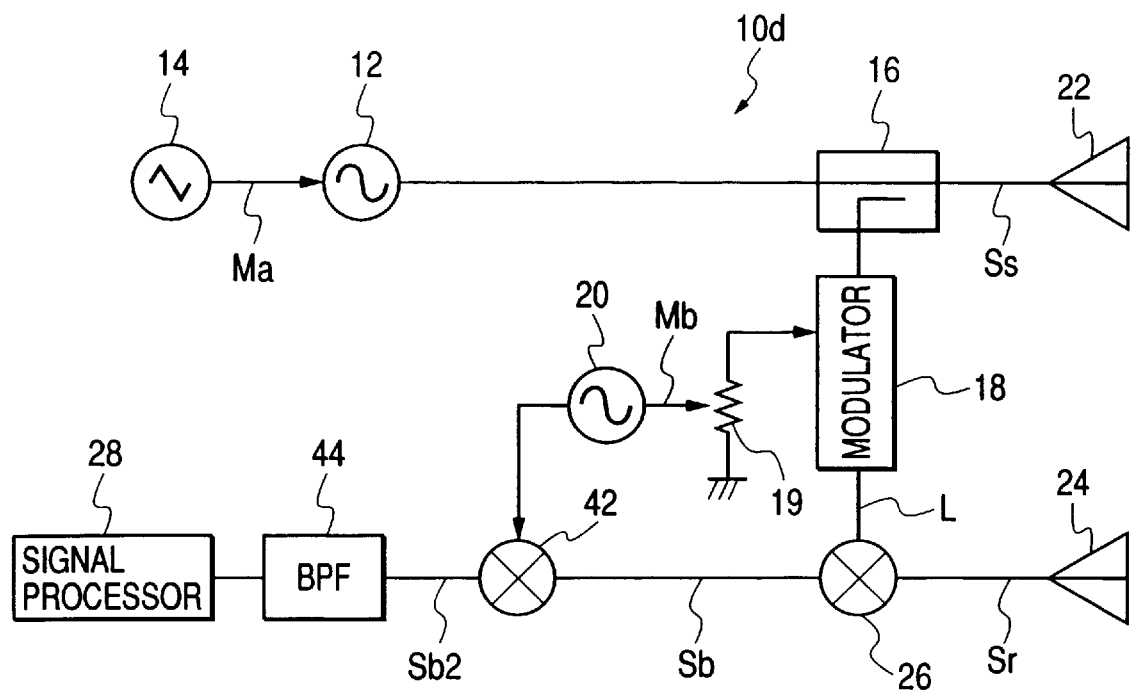
FIG. 7 is a block diagram which shows a radar apparatus according to the fifth embodiment of the invention.
Figure 8A:
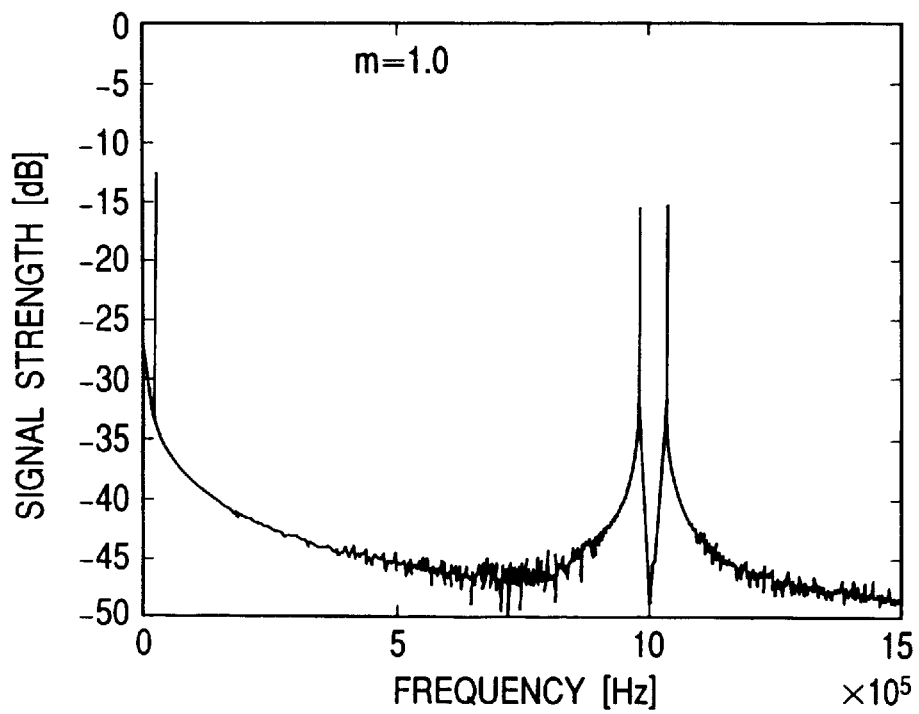
FIG. 8(a) is a graph which shows the spectrum determined by frequency-analyzing the waveform of a beat signal using the fast Fourier transform when the modulation index m=1.
Figure 8B:
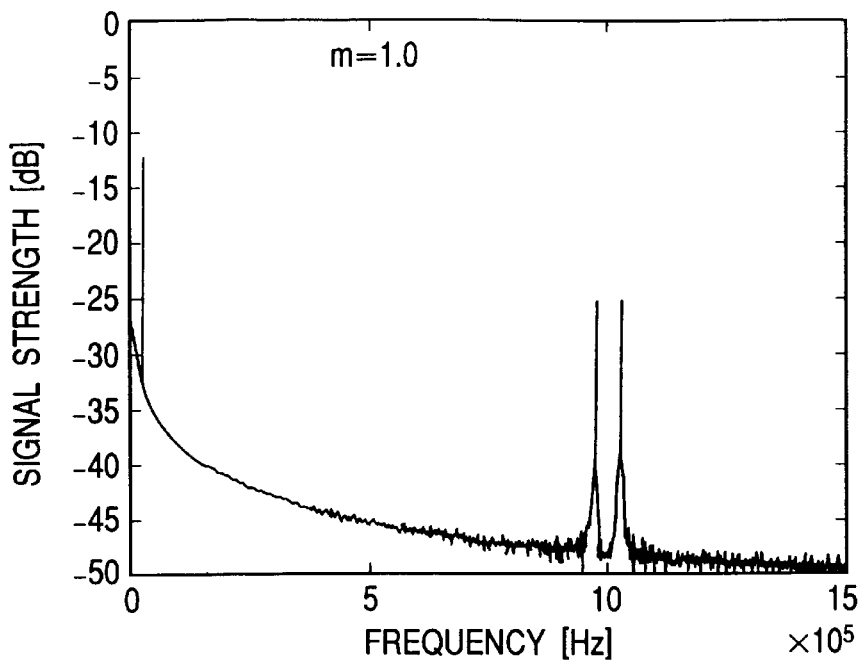
FIG. 8(b) is a graph which shows the spectrum determined by frequency-analyzing the waveform of a beat signal using the fast Fourier transform when the modulation index m=0.1.

FIG. 7 shows a radar apparatus 10d according to the fifth embodiment of the invention which is different from the fourth embodiment only in that a low-pass filter 44 is disposed between the intermediate-frequency mixer 42 and the signal processor 28 instead of the band-pass filter 40 for extracting the fundamental component with the frequency fu from the second beat signal Sb2. Other arrangements are identical, and explanation thereof in detail will be omitted here.

The beat signal Sb outputted from the high-frequency mixer 26 is mixed with the modulating signal Mb with the frequency Fs from the sine wave oscillator 20 to produce the second beat signal Sb2 which consists of the fundamental component into which the harmonic components of the beat signal Sb are converted and the harmonic components into which the fundamental frequency component of the beat signal Sb is converted. Low frequency noises superimposed on the beat signal Sb in the high-frequency mixer 26 are converted into signals in the vicinity of the harmonic components of the second beat signal Sb2.

The low-pass filter 44 transmits only the fundamental component (the frequency fu) of the second beat signal Sb2 to the signal processor 28. This allows the signal processor 28 to perform operations using the fundamental component, thereby resulting in a simplified structure and a decreased operation time for frequency analysis using the fast Fourier transform (FFT).

The passage of the second beat signal Sb2 through the low-pass filter 44 causes unwanted signal components and low frequency noises superimposed in the high-frequency mixer 26 to be removed from the second beat signal Sb2. The frequencies handled by the intermediate-frequency mixer 42 are several tends MHz at the most, and the lower frequency noises superimposed on the second beat signal Sb2 in the intermediate-frequency mixer 42 are small, thus resulting in an improved SN ratio of the second beat signal Sb2 inputted to the signal processor 28 as compared with the first to third embodiments.

Figure 11:
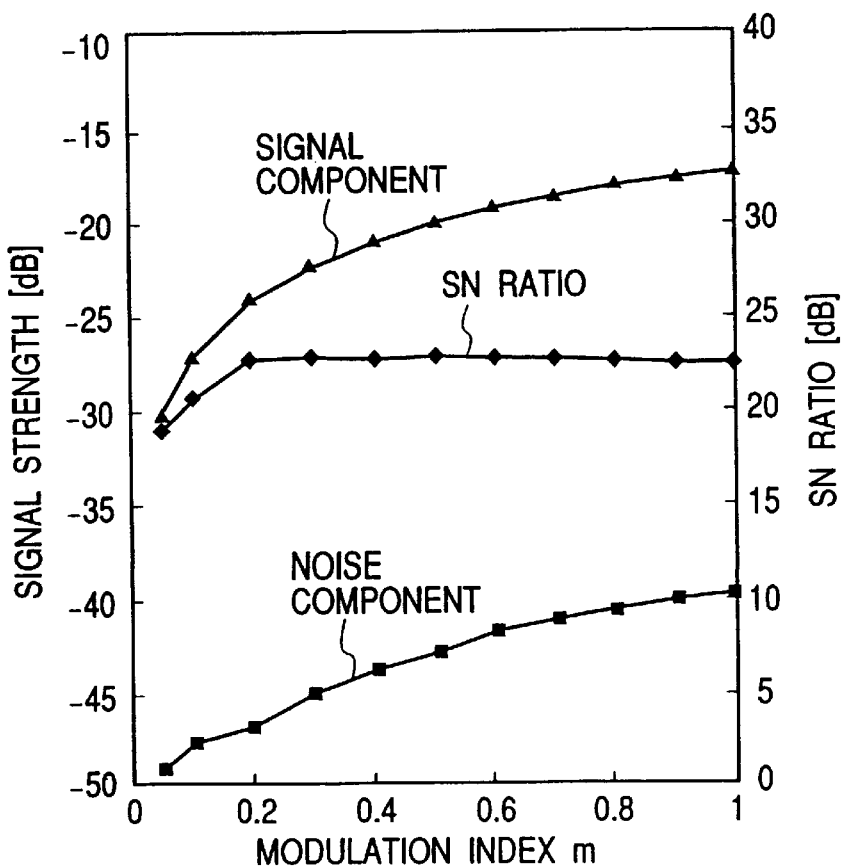
FIG. 11 is a graph which shows the signal strength of an output of a low-pass filter in the fifth embodiment, the signal strength of a noise component, and the SN ratio that is the ratio of the output of the low-pass filter to the noise component for different values of the modulation index m between 0.05 to 1.0.
Figures 12A, 12B:
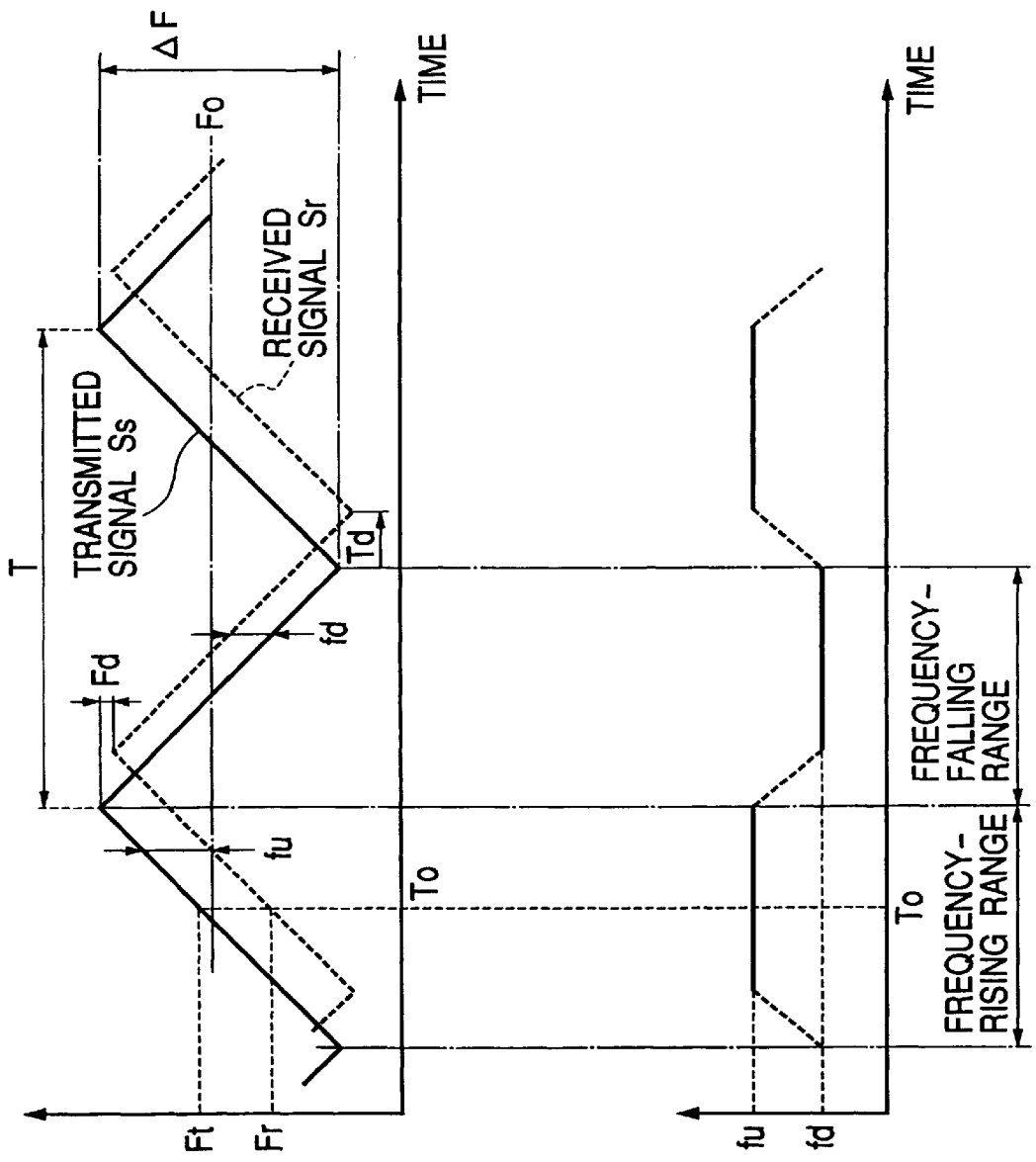
FIG. 12(a) shows the waveforms of transmitted and received signals in an FM-CW radar.
FIG. 12(b) shows the waveform of a beat signal in an FM-CW radar.

The inventors of this application performed simulations in terms of the relation between the signal strength and the modulation index m. The results are shown in FIG. 11. "▲" indicates the signal strength of an output of the low-pass filter 44. "■" indicates the signal strength of a noise component. "♦" indicates the SN ratio that is the ratio of the output of the low-pass filter 44 to the noise component for different values of the modulation index m between 0.05 to 1.0. Note that the signal strengths of the output of the low-pass filter 44 and the noise component are determined in the same manner as that in FIG. 9.

The intermediate-frequency mixer 42 used in the simulations is designed to multiply the beat signal Sb derived by the above equation (6) and the modulating signal Mb (cos(2 π·Fs·t+θs)) together. The low-pass filter 44 permits signal components of an output of the intermediate-frequency mixer 42 within a range of 0 to 100 KHz to pass therethrough.

It is found from FIG. 11 that when the modulating signal Mb consists of a single frequency component, and the distance to and relative speed of a target object are determined using the second beat signal Sb2 outputted from the intermediate-frequency mixer 42, the modulation index m is preferably more than or equal to 0.2. The decrease in modulation index m causes a variation in impedance in the amplitude modulator 18 to be decreased. Thus, in order to minimize the influence of the variation in impedance on other circuit components, it is advisable that the modulation index m be less than or equal to 0.5.

The low-pass filter 44 may be replaced with a low-frequency amplifier for amplifying the fundamental component of the second beat signal Sb2.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

For example, the fourth and fifth embodiments may use a combination of the band-pass filter 40 and the low-pass filter 44 and be designed to modulate the output signal Ss or the input signal Sr in amplitude without modulation of the local signal L through the amplitude modulator 18.

What is claimed is:

1. A radar apparatus comprising:
    a high-frequency generating circuit generating a high-frequency signal which is so modulated in frequency as to vary with time in a linear fashion and splitting the high-frequency signal into an output signal to be transmitted as a radar wave and a local signal;
    a high-frequency mixer mixing an input signal that is a return of the radar wave from a target object with the local signal produced by said high-frequency generating circuit to produce a beat signal consisting of a frequency component corresponding to a difference in frequency between the output signal and the input signal;
    a modulating signal producing circuit producing a modulating signal which is two or more times greater in frequency than a fundamental component of the beat signal as a function of a distance to and a relative speed of the target object; and
    an amplitude modulating circuit modulating an amplitude of at least one of the output signal, the input signal, and the local signal in accordance with the modulating signal so that a modulation index falls within a range of zero (0) to one (1).

2. A radar apparatus as set forth in claim 1, further comprising at least one of a band-pass filter which removing signal components of the beat signal other than harmonic components in the vicinity of the frequency of the modulating signal and a narrow-band amplifier which amplifies the harmonic components of the beat signal.

3. A radar apparatus as set forth in claim 1, further comprising an arithmetic circuit which determines at least one of the distance to and the relative speed of the target object based on the fundamental component of the beat signal produced by said high-frequency mixer.

4. A radar apparatus as set forth in claim 1, further comprising an intermediate frequency mixer which mixes the beat signal produced by said-high frequency mixer with the modulating signal from said modulating signal producing circuit to produce a second beat signal.

5. A radar apparatus as set forth in claim 4, further comprising at least one of a low-pass filter which removes signal components of the second beat signal produced by said intermediate frequency mixer other than the fundamental component and a low-frequency amplifier which amplifies the fundamental component.

6. A radar apparatus as set forth in claim 4, further comprising an arithmetic circuit which determines at least one of the distance to and the relative speed of the target object based on a fundamental component of the second beat signal produced by said intermediate-frequency mixer.

7. A radar apparatus as set forth in claim 1, wherein the modulating signal produced by said modulating signal producing circuit consists of a single frequency component, and wherein the modulation index provided by said amplitude modulating circuit is greater than or equal to 0.1.

8. A radar apparatus as set forth in claim 4, wherein the modulating signal produced by said modulating signal producing circuit consists of a single frequency component, and wherein the modulation index provided by said amplitude modulating circuit is greater than or equal to 0.2.

9. A radar apparatus as set forth in claim 7, wherein the modulation index provided by said amplitude modulating circuit is less than or equal to 0.5.

10. A radar apparatus as set forth in claim 8, wherein the modulation index provided by said amplitude modulating circuit is less than or equal to 0.5.

11. A radar apparatus as set forth in claim 1, wherein said amplitude modulating circuit includes a variable amplifier which changes a signal amplification factor with said modulating signal.

12. A radar apparatus as set forth in claim 1, wherein said amplitude modulating circuit includes a variable attenuator which changes a signal attenuation factor with said modulating signal.

* * * * *